United States Patent [19]

Eppinger et al.

[11] 4,229,545

[45] Oct. 21, 1980

[54] MATRIX AMPHOTERIC THERMALLY REGENERABLE ION EXCHANGE RESINS

[75] Inventors: Kurt H. Eppinger, Bentleigh; Mervyn B. Jackson, West Brunswick, both of Australia

[73] Assignee: ICI Australia Limited, Victoria, Australia

[21] Appl. No.: 11,667

[22] Filed: Feb. 12, 1979

[30] Foreign Application Priority Data

Feb. 27, 1978 [AU] Australia .............................. PD3526

[51] Int. Cl.$^2$ ............................................. B01D 15/04
[52] U.S. Cl. ...................................... 521/38; 521/28; 526/173; 526/176
[58] Field of Search .................... 526/90, 123; 521/38, 521/25, 28

[56] References Cited

U.S. PATENT DOCUMENTS

| | | | |
|---|---|---|---|
| 3,808,158 | 4/1974 | Bolto | 521/38 |
| 3,875,085 | 4/1975 | Bolto | 521/28 |
| 3,891,576 | 6/1975 | Battaerd et al. | 521/38 |
| 3,957,698 | 5/1976 | Hatch | 521/29 |

*Primary Examiner*—Joseph L. Schofer
*Assistant Examiner*—Peter F. Kulkosky
*Attorney, Agent, or Firm*—Cushman, Darby & Cushman

[57] ABSTRACT

Making amphoteric thermally regenerable ion-exchange resins by encapsulating poly (weak acid) ion exchange particles in a matrix of a polymer of opposite ion-exchange type in the presence of certain agents which inhibit the formation of deleterious salts between the resins.

15 Claims, No Drawings

MATRIX AMPHOTERIC THERMALLY REGENERABLE ION EXCHANGE RESINS

This invention relates to thermally regenerable ion-exchange resins and more especially it relates to such resins of the amphoteric composite type.

It is known that saline solutions may be demineralized at least in part by treating them with resinous material capable of acting as an ion-exchange material. One such method whereby saline solutions may be demineralized is one in which the resinous material is a thermally regenerable resin. Processes in which such resins are used are sometimes referred to as the "Sirotherm" process ["Sirotherm" is a Registered Trade Mark of ICI Australia Limited] and references to these processes are available in publications such as Australian Patent Specifications No. 274 029 and 434 130; "An Ion Exchange Process with Thermal Regeneration"

| Part I | J. Inst. Engr. Aust | (1965) 37, 193 |
|---|---|---|
| Part II | Aust. J. Chem. | (1966) 19, 561 |
| Part III | " | (1966) 19, 589 |
| Part IV | " | (1966) 19, 765 |
| Part V | " | (1966) 19, 791 |
| Part VI | " | (1968) 21, 2703 |
| Part VII | Desalination | (1970) 8, 21 |
| Part VIII | " | (1973) 12, 217 |
| Part IX | " | (1973) 13, 269; or |

"Desalination by Thermally Regenerable Ion Exchange" Proc Roy. Aust. Chem. Inst. (1976) 43, 345.

One useful class of thermally regenerable ion-exchange resins suitable for demineralizing saline solutions is a class comprising composite amphoteric resins containing particles of both an acidic ion exchange polymeric component and a basic ion exchange polymeric component. A particularly useful class of composite ion-exchange resins of the above amphoteric type is the class of thermally regenerable ion-exchange resins comprising discrete acidic and basic domains grouped together in a particle of bead which, when in a spherical form, has a diameter in a range from about 300 to 1200 microns. From within the above class of resins an effective sub-class is one in which the resins are known as "active-matrix" resins. By the term "active-matrix" resins we mean resins obtained by a process in which two polymer precursors, such as monomers, are polymerized to give a resin in which the matrix is a mosaic of both the acidic polymer component and the basic polymeric component. It will be appreciated that such an active-matrix may be formed by the simultaneous polymerisation of both monomers. In instances where the rate of polymerisation of the monomers is different then the matrix is formed, for example, by polymerising a slowly polymerising acidic monomer around particles of a faster polymerising basic polymer or vice versa. In a variation of the above methods of manufacture such active-matrix resins may be made by polymerizing a monomer 'X', in the presence of a preformed polymer 'Y', which is, for example, in particulate or celled form and thereby encapsulating the preformed polymer 'Y' particles in a matrix derived from the in situ polymerization of the monomeric component 'X'. It will be appreciated further that the active-matrix resins referred to herein are distinct from the so-called "plum pudding" resins described in the specification of Australian Pat. No. 434,130 and which comprise composite ion-exchange resins in particulate form and contain discrete particles of acidic and basic polymeric ion-exchange materials dispersed in an inert matrix of water-insoluble polymeric materials.

Active-matrix ion-exchange resins have been found to be useful as thermally regenerable ion-exchange resins for the demineralization of saline solutions. However attempts to prepare them by conventional methods have not always been successful. Thus for example when acrylic acid and an aqueous solution of triallylamine hydrochloride were polymerized by known means the resultant resin had no thermally regenerable ion-exchange capacity. Whilst we do not wish to be bound by theoretical considerations it seem likely that this lack of thermally regenerable ion-exchange capacity could be attributed to internal salt formation between the carboxylate and protonated amino groups. Attempts have been made to increase the thermally regenerable ion-exchange capacity of resins made in this manner by the use of a counter-ion route, or the use of a precipitating solvent, or using a method in which either or both monomers are employed as either homogeneous solutions or heterogeneous emulsions of electrically neutral precursors such as esters or amides. Whilst some success was achieved the thermally regenerable ion-exchange capacities obtained were usually far below the theoretical values expected from the polymeric components.

In the specification of U.S. Pat. No. 3,957,698 to Hatch there is a description of thermally reversible, heterogeneous, amphoteric ion-exchange resins made by a process comprising suspending weak acid cation or weak base anion exchange microbead particles in a liquid mixture of monomers which can be converted to a cross-linked matrix polymer of opposite ion exchange type, polymerizing the liquid monomer mixture to form a matrix resin having the microbead particles embedded therein and converting as necessary the microbead—matric resin into an active ion-exchange form. However, the ion-exchange resins made by this process, typically a cross-linked bead of polyacrylic or polymethacrylic acid incorporated in a matrix resin of an aminated styrene-divinylbenzene resin, had comparatively low thermally reversible ion-exchange capacities. A typical claimed value for this capacity was 0.20 meq/ml resin.

We have now discovered processes for the manufacture of thermally reversible amphoteric ion-exchange resins in particulate or beadform, particularly those of the active-matrix type, which have enhanced thermally regenerable ion-exchange capacity characteristics in comparison with similar characteristics of amphoteric ion-exchange resins of the prior art. These new processes are similar to processes used to make amphoteric ion-exchange resins of the prior art except that they are performed in the presence of certain inhibiting agents. The action of such inhibiting agents during the process is not clearly understood, but it would seem that, without prejudice to the invention, they modify the mechanism of the process in a manner such that the formation of internal salts which block the active exchange sites is inhibited.

Accordingly the present invention provides an improvement in the process for the preparation of an amphoteric ion exchange resin comprising acidic and basic ion exchange components by suspending particles comprising a polymeric ion exchange material in a liquid phase comprising precursor material which is capable of being converted into a matrix polymer of opposite ion exchange type to the polymeric particles, and by causing the precursor material to form a matrix which encapsulates the said polymeric particles, the improvement being that the matrix formation step is carried out in the presence of an inhibiting agent. By inhibiting agent we mean a material, the presence of which in the process of manufacture of an amphoteric ion exchange resin will cause the resin so produced, after the inhibiting agent has been removed from it, to have an ion exchange capacity markedly greater than that of a similar resin prepared by the same process but in the absence of any inhibiting agent.

The amphoteric ion exchange resins which may be made by the process of this invention may be one of two types broadly defined as acid in base type, hereinafter referred to as AB type, and as base in acid type, hereinafter referred to as BA type. By way of explanation an AB type resin is exemplified by one which consists of particles of poly(acrylic acid), providing the acidic ion exchange component, encapsulated in a matrix of a basic ion exchange component obtained by the polymerisation of diallylamine.

By precursor material we mean monomeric material, or partially polymerised material, which is capable of being further polymerised and/or crosslinked to form a solid matrix. Preferably the precursor material is a monomer.

According to a preferred embodiment of the invention there is provided a process for the preparation of an amphoteric ion exchange resin of type AB by suspending particles comprising a polymeric material containing weakly acidic ion exchange groups in a liquid phase comprising a precursor material capable of being converted to a matrix material comprising a polymeric material containing weakly basic ion exchange groups and by causing said precursor material to form a matrix which encapsulates the polymeric particles wherein the matrix formation step is carried out in the presence of an inhibiting agent.

The nature of the inhibiting agent may vary widely. Thus for example in the production of AB resins the agent may be essentially an inorganic salt derived from a metal selected from Groups 2A, 2B, 3A, 4A, 6B and 7B of the periodic table of elements. In referring to the periodic table of elements we mean a table derived from the periodic table of Mendeleef and set out typically at page B-3 of the Handbook of Chemistry and Physics, 55th edition 1974–75, published by CRC Press of Cleveland, Ohio, USA. Very suitable salts which may act as inhibiting agents in the improved process of the invention include those of calcium, barium, copper, aluminium, tin, lead or manganese. Alternatively in the production of AB resins, the inhibiting agent may be also a weakly basic organic compound, such as an amine, for example allylamine.

Suitable inhibiting agents for use in the production of BA resins by the process of this invention are mineral acids, such as phosphoric acid, salts of inorganic acids such as phosphates, and organic acids, such as benzoic acid, p-hydroxybenzoic acid, gentisic acid and 3,5-dinitrosalicylic acid.

The amount of inhibiting agent present during the process of the invention will vary to some extent with the nature of the acidic and basic components of the desired ion exchange resin product.

However, for the preparation of AB resins by the process of the invention it has been found with various combinations of acidic and basic components that a suitable amount of inhibiting agent is one which provides cations, in a range from 0.01 to 1 ionic equivalent for every equivalent in terms of acidic ion exchange sites on the acidic component of the ion exchange resin.

Conversely for the preparation of a BA resin the suitable amount of inhibiting agent is one which provides anions from 0.01 to 1 ionic equivalent for every equivalent in terms of basic ion exchange sites on the basic component of the ion exchange resin.

The process of the invention is useful for manufacturing amphoteric ion exchange resin comprising discrete acidic and basic components and is very advantageous for making ion exchange resins of the active matrix type, especially in embodiments of the invention wherein monomeric material of the amine type, such as triallylamine, diallylamine, methyldiallylamine or isopropyldiallylamine, is polymerised in the presence of particles of an acidic polymer such as poly(acrylic) or poly(methacrylic acid). The process of the invention is particularly useful for the manufacture of resins of the AB type wherein an acidic component of poly(acrylic acid) is encapsulated in a basic polymeric component matrix obtained by the polymerisation of diallylamine.

Basic monomeric materials from which basic component of the ion exchange resin (i.e., the matrix polymer or the weakly basic particles) may be made are varied and well known. Useful basic matrices and particles may be prepared from amines of both the aromatic type and the aliphatic type. As a typical example of aromatic amines reference is made to amine derivatives of styrene.

In respect to aliphatic amines it is preferred to use unsaturated monomers, and more preferred that such monomers be of the allylamine type such as triallylamine, diallylamine or derivatives thereof. Such basic resins of the poly(allylamine) class are described for example in U.S. Pat. Nos. 3,619,394, 3,716,481 or 3,957,699. Typical monomers from which such resins may be derived include for example triallylamine, diallylamine and various diallylamine derivatives such as alkyldiallylamines, aralkyldiallylamines, bis(N,N-diallylamino) alkanes and N,N,N',N'-tetrallylalkanediamines. Typical monomeric representatives of the diallylamine class include for example
diallylamine,
methyldiallylamine,
ethyldiallylamine,
n-propyldiallylamine,
isopropyldiallylamine,
n-butyldiallylamine,
benzyldiallylamine,
1,6-bis(N,N-diallylamino)hexane,
1,4-bis(N,N-diallylaminomethyl)benzene,
1,2,4-tris(N,N-diallylaminomethyl)benzene,
1,3,5-tris(N,N-diallylaminomethyl)benzene,
2,4,6-tris(N,N-diallylaminomethyl)toluene,
N-(4-N,N-dimethylaminomethylbenzyl)diallylamine,
N-(4-N,N-dipropylaminomethylbenzyl)diallylamine,
N-(4-N,N-diisopropylaminomethylbenzyl)diallylamine,
N-(4-N,N-diallylaminomethylbenzyl)diallylamine, or
4-(4-N,N-dimethylbenzyl)diallylamine In the foregoing description of the various embodiments of the invention reference has been made to monomers capable of being converted to polymeric material, and in such description the polymeric material has been of the homopolymeric type. It also lies within our invention that the polymeric material used in the process of the invention may also be of the copolymeric type. Suitable copolymers include those derived from a range of alkyl-substituted diallylamines such as methyl-, ethyl-, propyl-, isopropyl- or n-butyldiallylamine in conjunction with bis(N,N-diallylamine)-1,6-hexane.

The polymeric materials derived from such basic monomers may be cross-linked in part prior to being used as a component of an ion-exchange resin and conveniently the degree of cross-linking may be in a range from 3 to 25% and frequently in a range from 5 to 10%, on a molar basis with respect to the polymer; the cross-linking moiety being, for example, aromatic such as p-xylylene or aliphatic such as hexamethylene.

As in the instance of the basic monomeric materials referred to above, the corresponding acidic monomeric materials from which the matrix polymer and the weakly acidic particles may be made are also varied and well known. Preferred monomers include ethylenically unsaturated carboxylic acids, such as acrylic acid, methacrylic acid, maleic acid, itaconic acid, crotonic acid, or vinyl benzoic acid. Alternatively, derivatives of such monomers such as an ester, anhydride or nitrile which can be converted into the desired weak acid functionality by hydrolysis can be used. Typical examples of such derivatives include methyl acrylate, maleic anhydride or acrylonitrile. It is often desirable to cross-link such acidic polymeric components and under these circumstances it is convenient to have from 0.5 to 10% of a polyvinyl cross-linker present with the acidic monomer during the polymerization step. Suitable polyvinyl cross-linking agents include divinylbenzene, divinylpyridine, divinyltoluene, divinylnaphthalene, diallylphthalate, ethylene glycol diacrylate, ethyleneglycol dimethylacrylate, diallylsuccinate or N,N'-methylenediacrylamide. Particularly suitable acidic polymeric components are those prepared by polymerization of acrylic or methacrylic acid optionally cross-linked by the use of divinylbenzene.

In view of the enhanced capability of the ion-exchange resins made by the process of the invention to be regenerated it is apparent that they differ from similar resins of the prior art and accordingly in a further aspect of the invention we provide as new compositions of matter the ion-exchange materials, preferably in the form of beadlike particles, made by the processes as hereinbefore described.

The invention has provided a significant advance in the technology relating to the manufacture and use of thermally regenerable ion exchange resins. The resins of the invention are such that it is now practical to use them for the demineralization of saline solutions over prolonged periods since they are receptive to repetitive thermal regeneration and the ion-exchange capacity so regenerated is considerably greater, for example up to about 45% greater, than the thermally regenerated ion-exchange capacity of similar resins of the prior art.

The invention is now illustrated by but is not limited to the following examples in which all parts and percentages are expressed on a weight basis unless otherwise specified. Example 2 does not lie within the invention and is included for the purposes of comparison.

EXAMPLE 1

A ground paste containing 940 parts of poly(acrylic acid) and 1720 parts of water, and 1170 parts of barium chloride were mixed to provide a mixture in which the number of equivalents of the barium salt added to the mixture was approximately the same as the number of equivalents of acrylic acid present in the mixture. The mixture was diluted further with 200 parts of water and whilst being stirred there was added thereto an amount of a 2 N aqueous sodium hydroxide solution sufficient to adjust the pH of the resultant suspension to a value of 3.8. The suspension was filtered to separate the solid component from the suspension and this solid component in moist form was added gradually to a first composition containing 1580 parts of diallylamine hydrochloride, 300 parts of 1,6-bis(N,N-diallylamino)hexane dihydrochloride, 400 parts of water and 100 parts of azobisisobutyramidinium dihydrochloride. The mixture so obtained was degassed with nitrogen and then added to a stirred solution of 5 parts of "Kemamine" and 5 parts of di-n-octadecylamine in 40,000 parts of paraffin oil, the solution being at a temperature of 65° C. in a reaction vessel having an atmosphere of nitrogen. The second composition so obtained was stirred for 20 hours at a temperature of 65° C. during which time an amount of particulate material was formed. This particulate material, which was essentially in the form of beadlike spheres or quasi-spheres having diameters in a range from 0.5 to 1.5 millimeters, was separated from the reaction mixture by filtration and washed successively with amounts of hexane, an aqueous 2 N solution of HCl, and a solution of HCl having a pH of 3. The product so obtained was dried under vacuum to provide a composition of the invention. The acidic polymeric component of the composition so obtained had an ion-exchange capacity of 4.76 milliequivalents per gram of composition whilst the ion-exchange capacity of the basic polymeric component was 3.0 milliequivalents per gram of composition. The composition had a thermally regenerable ion-exchange capacity of 1.80 milliequivalents per gram of composition. ("Kemamine" is a trade name for a surfactant composition available from National Dairy Products Corporation, Memphis, USA, and believed to comprise a long chain fatty amine).

EXAMPLE 2

For the purposes of comparison the general procedure of Example 1 was repeated except that in the present example the barium chloride was omitted. The ion-exchange resin so obtained had a thermally regenerable ion-exchange capacity of 1.23 milliequivalents per gram of resin.

EXAMPLES 3 to 9 INCLUSIVE

The general procedure of Example 1 was repeated except that the barium salt of that example was replaced by other salts the metallic component of which is set out in Table 1. Table 1 also sets our the number of equivalents of metallic salt added to the mixture for each equivalent of acrylic acid present in the mixture. In Table 1 also there is tabulated the ion-exchange capacity of the acidic and basic polymeric components of the compositions and the thermally regenerable ion-exchange capacity of the composition, said capacities being expressed in milliequivalents per gram of composition.

TABLE 1

| Example No | Metallic ion type | Equivlents of metallic ion | Ion-exchange capacity (milliequivalents per gram) | | |
|---|---|---|---|---|---|
| | | | Acidic Component | Basic Component | Thermally Regenerable |
| 3 | Chromium-3 | 1 | 4.31 | 3.85 | 1.30 |
| 4 | Calcium | 1 | 3.73 | 4.49 | 1.33 |
| 5 | Aluminium | 1 | 5.38 | 3.15 | 1.46 |

TABLE 1-continued

| Example No | Metallic ion type | Equivlents of metallic ion | Ion-exchange capacity (milliequivalents per gram) | | |
|---|---|---|---|---|---|
| | | | Acidic Component | Basic Component | Thermally Regenerable |
| 6 | Manganese-2 | 1 | 4.71 | 3.25 | 1.52 |
| 7 | Lead-2 | 1 | 4.57 | 3.53 | 1.56 |
| 8 | Tin-2 | 1 | 4.14 | 3.98 | 1.57 |
| 9 | Copper-2 | 0.02 | 5.09 | 2.86 | 1.40 |

EXAMPLE 10

The general procedure of Example 1 was repeated except that the pH of the suspension was adjusted to a value of 5.5. The thermally regenerable ion-exchange capacity of the resinous composition of the invention so obtained was 1.62 milliequivalents per gram of the said resinous composition.

EXAMPLE 11

A solution containing 64 parts of allylamine and 500 parts of water was added with mixing to a slurry containing 940 parts of ground poly(acrylic acid) and 2720 parts of water. The mixture so prepared was allowed to react at ambient temperature for 20 minutes to form an organic salt and was then filtered so as to separate the solid component of the reaction mixture from the bulk of the residual components thereof. The solid component so obtained in moist form was added gradually to a first composition containing 1580 parts of diallylamine hydrochloride, 300 parts of 1,6-bis(N,N-diallylamino) hexane dihydrochloride and 500 parts of water and the mixture so prepared was homogenized. 100 parts of azobisiso-butyramidinium dihydrochloride was then added and the mixture so obtained was degassed with nitrogen and then added to a stirred solution of 5 parts of "Kemamine" and 5 parts of di-n-octadecylamine in 40,000 parts of paraffin oil, the solution being at a temperature of 65° C. in a reaction vessel having an atmosphere of nitrogen. The second composition so obtained was stirred for 20 hours at a temperature of 65° C. during which time an amount of particulate material was formed. This particulate material was separated from the reaction mixture by filtration and washed successively with amounts of hexane, an aqueous 2 N solution of HCl, and a solution of HCl having a pH of 3. The product so obtained was dried under vacuum. The acidic polymeric component of the composition so obtained had an ion-exchange capacity of 4.5 milliequivalents per gram of composition whilst the ion-exchange capacity of the basic polymeric component was 3.6 milliequivalents per gram of composition. The composition had a thermally regenerable ion-exchange capacity of 1.53 milliequivalents per gram of composition.

EXAMPLE 12

The general procedure of Example 11 was repeated except that amount of allylamine used to react with the poly(acrylic acid) was increased to 192 parts. The composition so obtained had a thermally regenerable ion-exchange capacity of 1.48 milliequivalents per gram of composition.

EXAMPLE 13

A mixture of 1000 parts of poly(ethylacrylate) gel containing 68% of solids and cross-linked with 2.5% of divinylbenzene, 12 parts of barium chloride, 1580 parts of diallylamine hydrochloride and 300 parts of 1,6-bis(N,N-diallylamino) hexane dihydrochloride is prepared and allowed to stand at ambient temperature for 60 minutes. It is then homogenized, 100 parts of azobisisobutyramidinium dihydrochloride and 400 parts of water are added and the resultant composition is homogenized further and degassed to form a slurry. The slurry is added with stirring to a mixture of 40,000 parts of paraffin oil, 5 parts of dioctadecylamine, and 5 parts of "Kemamine", and the dispersion so formed is heated at a temperature of 65° C. for a period of 20 hours, during which time particulate material is formed in the dispersion. This particulate material is separated from the dispersion, washed with hexane, 2 N hydrochloric acid and hydrochloric acid at pH 3, and is then dried to provide resinous material. 100 parts of this resinous material is refluxed for 40 hours under an atmosphere of nitrogen with 3000 parts by volume of a saturated solution of alcoholic potassium hydroxide to provide an ion-exchange resin having a thermal regenerable capacity of 2.1 milliequivalents per gram of resin.

EXAMPLE 14

The general procedure of Example 13 is repeated except that the poly(ethylacrylate) gel of that example is replaced by a resinous ester made by a process in which 5 parts of poly(acrylic acid) is refluxed for 20 hours with a mixture of 10 parts by volume of methanol, 50 parts by volume of benzene and a catalytic amount of sulphuric acid in a Dean & Stark type of apparatus suitable for removing the water formed during the process, thereby forming a resinous product which is separated, dried and used as the resinous ester of the present example. The ion-exchange material so obtained has a thermally regenerable ion-exchange capacity of 1.79 milliequivalents per gram of material.

We claim:

1. A process for the preparation of an amphoteric ion exchange resin comprising acidic and basic ion exchange components wherein particles comprising a polymeric acidic ion exchange material are suspended in a liquid phase comprising a precursor material capable of being converted into a matrix of polymeric basic ion exchange material, and wherein the said precursor material which is monomeric or partially polymerized is caused to form a matrix which encapsulates the said particles characterised in that the matrix formation step is carried out in the presence of an inhibiting agent, said inhibiting agent being selected from the group consisting of a salt of a metal selected from the group of metals consisting of those defined in Groups 2A, 2B, 3A, 4A, 6B and 7B of the periodic table of elements and, a weakly basic organic material.

2. A process according to claim 1 wherein said matrix is formed from said precursor material by a process involving polymerisation.

3. A process according to claim 1 wherein said matrix is formed from said precursor material by a process involving cross-linking.

4. Process according to claim 1 wherein said metal is selected from the group consisting of calcium, barium, copper, aluminium, tin, lead and manganese.

5. Process according to claim 1 wherein said weakly basic organic material is an amine.

6. An amphoteric ion exchange resin comprising discrete acidic and basic ion exchange components made by a process according to claim 1.

7. An ion exchange resin according to claim 6 wherein the said acidic ion exchange component is derived from an ethylenically unsaturated carboxylic acid.

8. An ion exchange resin according to claim 7 wherein said ethylenically unsaturated carboxylic acid is selected from the group consisting of acrylic acid, methacrylic acid, maleic acid, itaconic acid, crotonic acid and vinyl benzoic acid.

9. An ion exchange resin according to claim 6 wherein the said acidic ion exchange component is a derivative of an ethylenically unsaturated carboxylic acid selected from the group of derivatives consisting of esters, anhydrides and nitriles.

10. An ion exchange resin according to claim 6 wherein the acidic ion exchange component is a cross-linked polymer.

11. An ion exchange resin according to claim 6 wherein the said basic ion exchange component is derived from an unsaturated polymerizable amine.

12. An ion exchange resin according to claim 11 wherein said amine is unsaturated aliphatic amine selected from the group consisting of triallylamine and derivatives thereof, and diallylamine and derivatives thereof.

13. An ion exchange resin according to claim 6 wherein said basic ion exchange component is a copolymer.

14. An ion exchange resin according to claim 6 wherein said basic ion exchange component is a cross-linked polymer.

15. An amphoteric ion exchange resin made by a process according to claim 1 which comprises as the acidic ion exchange component particles of poly(acrylic acid) embedded in a matrix, which constitutes the basic ion exchange component, obtained by the polymerisation of diallylamine in the presence of a barium salt.

* * * * *